United States Patent [19]

Suzuki et al.

[11] Patent Number: 5,427,361
[45] Date of Patent: Jun. 27, 1995

[54] VIBRATION ISOLATING APPARATUS

[75] Inventors: Yasuhiro Suzuki; Hiroshi Kojima, both of Yokohama, Japan

[73] Assignees: Nissan Motor Co., Ltd., Yokohama; Bridgestone Corporation, Tokyo, both of Japan

[21] Appl. No.: 194,518

[22] Filed: Feb. 10, 1994

[30] Foreign Application Priority Data

Feb. 15, 1993 [JP] Japan ................. 5-025254

[51] Int. Cl.⁶ ............................................ F16F 13/00
[52] U.S. Cl. .................. 267/140.12; 267/140.15; 267/219
[58] Field of Search ............ 267/140.12, 219, 140.15, 267/140.14, 140.11, 140.13, 220; 180/300, 312, 902; 248/562, 636, 638

[56] References Cited

U.S. PATENT DOCUMENTS 5,310,169 5/1994 Kojima ..................... 267/140.15

FOREIGN PATENT DOCUMENTS

| | | |
|---|---|---|
| 0368352 | 5/1990 | European Pat. Off. . |
| 0460278A1 | 12/1991 | European Pat. Off. . |
| 0516304A2 | 12/1992 | European Pat. Off. . |
| 2633359 | 2/1989 | France . |
| 63-106441 | 5/1988 | Japan . |

*Primary Examiner*—Douglas C. Butler
*Attorney, Agent, or Firm*—Oliff & Berridge

[57] ABSTRACT

A vibration isolating apparatus which damps and absorbs vibrations from a vibration generating portion. A first restricting passage, a second restricting passage and a third restricting passage are formed in a block member. Respective transit resistances of these restricting passages are different. One end portion of the first restricting passage is provided so as to be able to communicate with a main liquid chamber, and another end portion communicates with a sub-liquid chamber. One end portion of the second restricting passage is provided so as to be able to communicate with the main liquid chamber, and another end portion has an open portion. One end portion of the third restricting passage communicates with the sub-liquid chamber, and another end portion communicates with the second restricting passage. A rotor is rotated to a first position at which the main liquid chamber and the sub-liquid chamber communicate via the first restricting passage and to a second position at which the second restricting passage communicates with the main liquid chamber. In accordance with the invention, liquid passes through the first, second and third restricting passages, and moves reciprocally between the main liquid chamber and one of the sub-liquid chamber and the second restricting passage in accordance with frequency of vibration. Accordingly, vibrations of a wide range of frequencies can be absorbed.

20 Claims, 6 Drawing Sheets

VIBRATION ISOLATING APPARATUS

BACKGROUND OF THE INVENTION

1. Field of Invention

The present invention relates to a vibration isolating apparatus which is used in an engine mount or the like of a vehicle and which damps and absorbs vibrations from a vibration generating portion.

2. Description of the Related Art

In automobile engines, a vibration isolating apparatus serving as an engine mount is disposed between the engine and the vehicle body. The vibration isolating apparatus prevents vibration off the engine from being transferred to the vehicle body.

A main liquid chamber and a sub-liquid chamber are formed within the vibration isolating apparatus. Both chambers are filled with a liquid. The main liquid chamber and the sub-liquid chamber are connected to each other by a first restricting passage and a second restricting passage. The first restricting passage absorbs shake vibration (e.g., vibration of a frequency of less than 15 Hz) and the second restricting passage absorbs idle vibration (e.g., vibration of a frequency of 20 to 40 Hz) which is of a higher frequency range than shake vibration. The sectional area of the second restricting passage in a direction normal to the longitudinal direction (the longitudinal direction is the direction in which the liquid passes) is larger than the sectional area of the first restricting passage. This second restricting passage is provided with a passage opening and closing member for setting a state in which the main liquid chamber and the sub-liquid chamber communicate with each other and a state in which they do not communicate with each other.

in the above-described vibration isolating apparatus, when a vehicle travels at high speeds or the like, shake vibration is generated. Here, the second restricting passage does not communicate with the main liquid chamber due to the passage opening and closing member. Namely, the liquid moves reciprocally between the main liquid chamber and the sub-liquid chamber via the first restricting passage only. The shake vibration is absorbed by resistance when the liquid passes through the first restricting passage or by liquid-column resonance. On the other hand, when the vehicle travels at low speeds of, for example, about 5 km/h, idle vibration is generated. Here, the first restricting passage becomes clogged and the second restricting passage communicates due to the passage opening and closing member. The liquid moves reciprocally between the main liquid chamber and the sub-liquid chamber via the second restricting passage. Accordingly, the idle vibration is absorbed by resistance when the liquid passes through the second restricting passage or by liquid-column resonance.

In the conventional vibration isolating apparatus described hereinbefore, shake vibration as well as idle vibration can be absorbed. However, when the vehicle travels at 40 to 120 km/h and shaking sounds (e,g., vibration of a frequency of 60 to 200 Hz) are generated, the shaking sounds cannot be absorbed completely by the conventional apparatus.

SUMMARY OF THE INVENTION

In view of the aforementioned, an object of the present invention is to obtain a vibration isolating apparatus which can absorb vibrations of a wide range of frequencies.

The present invention is a vibration isolating apparatus which damps and absorbs vibrations from a vibration generating portion comprising an outer cylinder connected to one of a vibration generating portion and a vibration receiving portion; an inner cylinder connected to another of the vibration generating portion and the vibration receiving portion; an elastic body provided between said outer cylinder and said inner cylinder, and deforming when vibration is generated; a block member provided at an interior off said outer cylinder; a main liquid chamber formed between said elastic body and said block member, and able to expand and contract; a sub-liquid chamber separated from said main liquid chamber, and able to expand and contract; a first diaphragm forming a portion of a partitioning wall of said sub-liquid chamber, and permitting expansion and contraction of said sub-liquid chamber; a first restricting passage which is formed in said block member, one end portion of said first restricting passage being provided so as to be able to communicate with said main liquid chamber via a cylindrical space formed in said block member, and another end portion of said first restricting passage communicating with said sub-liquid chamber; a second restricting passage which is formed in said block member, one end portion of said second restricting passage being provided so as to be able to communicate with said main liquid chamber via said cylindrical space, another end portion of said second restricting passage having an open portion which opens so as to oppose an inner circumferential surface of said outer cylinder, and a transit resistance of said second restricting passage being smaller than a transit resistance off said first restricting passage; a third restricting passage which is formed in said block member, one end portion of said third restricting passage communicating with said sub-liquid chamber, another end portion of said third restricting passage communicating with said second restricting passage, and a transit resistance of said third restricting passage being larger than the transit resistance of said first restricting passage; a second diaphragm which closes the open portion of said second restricting passage, and which is more rigid than said first diaphragm with respect to liquid pressure; and a rotor which is formed in a hollow cylindrical shape and has an opening in a circumferential wall of said rotor, said rotor being rotatably disposed in a rotor-setting-space which is formed in a cylindrical space and which is provided at an intermediate portion of a cylindrical space of said block member, said rotor rotating to a first position at which said opening opposes said first restricting passage so that said main liquid chamber and said sub-liquid chamber are communicated via said first restricting passage and said second restricting passage is closed, and said rotor rotating to a second position at which said opening opposes said second restricting passage so that said second restricting passage communicates with said main liquid chamber and said first restricting passage is closed.

In accordance with the present invention as described above, the first, second and third restricting passages are provided for communication between the main liquid chamber and the sub-liquid chamber. When vibration of a relatively high frequency range among low frequencies is generated by the vibration generating portion, the rotor is rotated to reach the first position. At the first position, the opening opposes the first restricting passage, the first restricting passage is opened so that the main liquid chamber and the sub-liquid chamber are communicated via the first restricting passage, and the second restricting passage is closed. In this state, the liquid passes through the first restricting passage and moves reciprocally between the main liquid chamber and the sub-liquid chamber. Accordingly, vibration generated by the vibration generating portion is absorbed by liquid-column resonance of the liquid in the first restricting passage.

When high frequency vibration is generated by the vibration generating portion, the rotor is rotated to the second position. At the second position, the opening opposes the second restricting passage, the second restricting passage is opened so as to communicate with the main liquid chamber, and the first restricting passage is closed. In this state, the third restricting passage is clogged. The liquid passes through the second restricting passage, whose transit resistance is lower than that of the first restricting passage, and moves reciprocally between the main liquid chamber and the second restricting passage. Vibration generated by the vibration generating portion is absorbed by liquid-column resonance of the liquid in the second restricting passage. In this state, when vibration of a relatively low frequency range among row frequencies is generated by the vibration generating portion, the liquid passes through the third restricting passage, whose transit resistance is higher than that of the first restricting passage, and moves reciprocally between the main liquid chamber and the sub-liquid chamber. Vibration generated by the vibration generating portion is absorbed by resistance when the liquid passes through the third restricting passage and by liquid-column resonance.

In accordance with the present invention as described above, the liquid passes through the first, second and third restricting passages, whose respective transit resistances are different, and moves reciprocally between the main liquid chamber and one of the sub-liquid chamber and the second restricting passage in accordance with the frequency of vibrations. Accordingly, vibration can be effectively absorbed in accordance with the frequency of the vibration, and vibrations of a wide range of frequencies can be absorbed.

Due to the above-described structure, the present invention has a superior effect in that a vibration isolating apparatus, in which vibrations off a wide range of frequencies can be absorbed, can be obtained.

DESCRIPTION OF THE PREFERRED EMBODIMENT

A vibration isolating apparatus relating to a first embodiment of the present invention will be described hereinafter in accordance with FIGS. 1 through 5.

Figure 1:
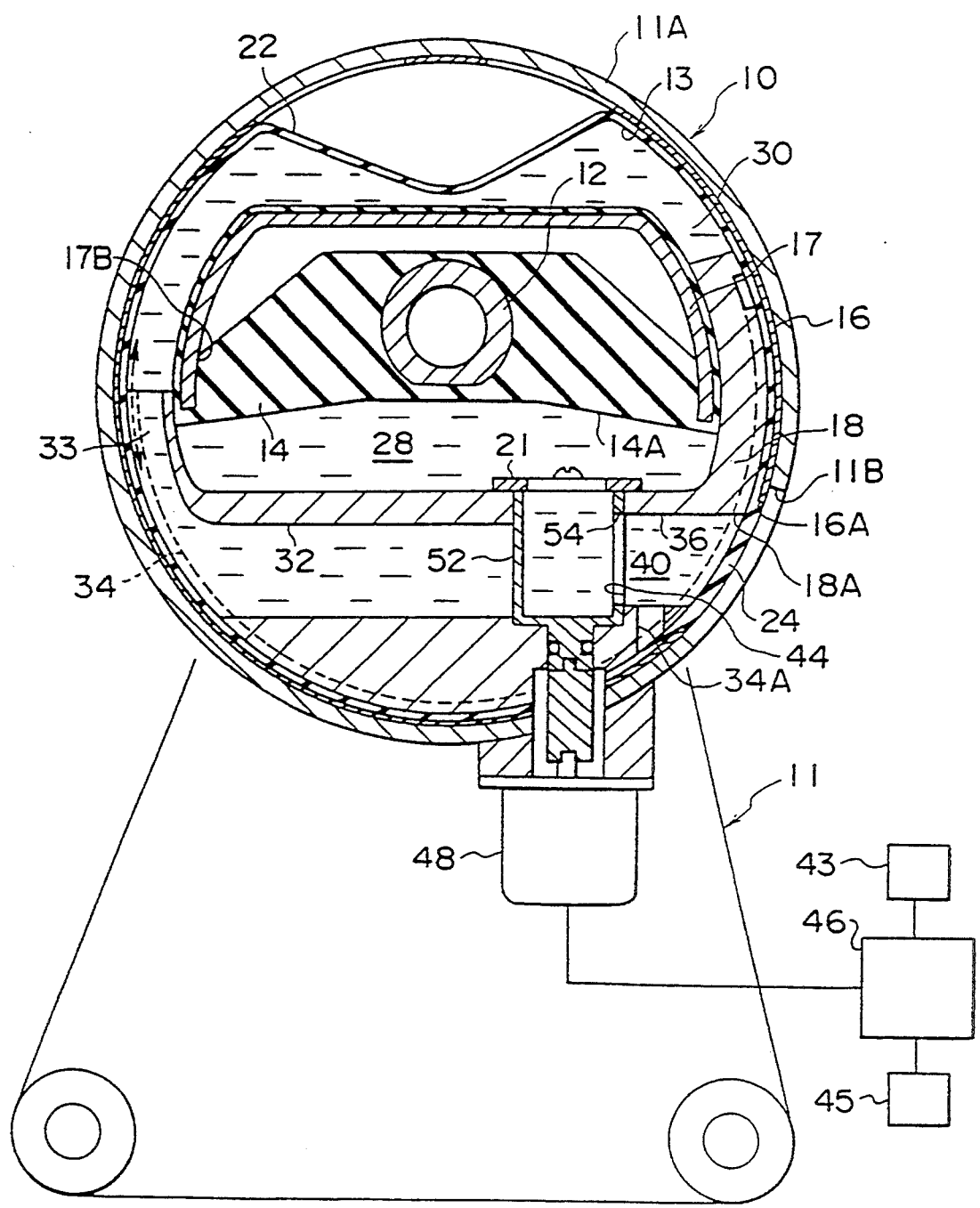
FIG. 1 is a sectional view of a vibration isolating apparatus relating to a first embodiment of the present invention.
Figure 2:
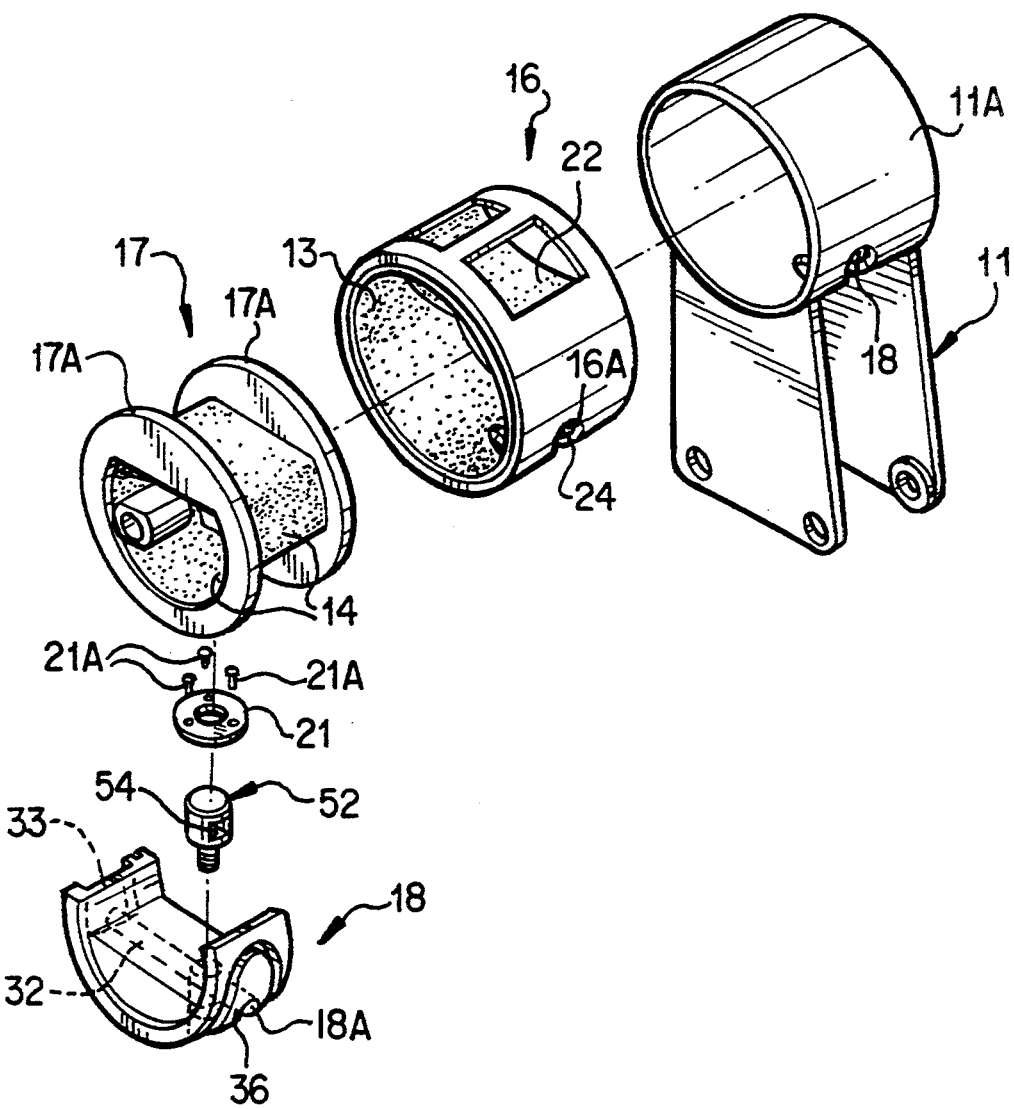
FIG. 2 is an exploded perspective view showing main portions of FIG. 1.

As illustrated in FIGS. 1 and 2, a vibration isolating apparatus 10 is mounted in a state in which a cylindrical outer cylinder 16 is inserted in an annular portion 11A of a mounting frame 11 used to mount the vibration isolating apparatus 10 to a vehicle body which is an unillustrated vibration receiving portion. The vibration isolating apparatus 10 includes a cylindrical inner cylinder 12. The axis of the inner cylinder 12 and the axis of the outer cylinder 16 are substantially parallel. In the present embodiment, the inner cylinder 12 is connected to an unillustrated engine which serves as a vibration generating portion.

A thin rubber layer 13 is bonded by vulcanization to the inner side of the outer cylinder 16. A portion of the thin rubber layer 13 is separated from the inner circumferential surface of the outer cylinder 16 so as to form a first diaphragm 22. Intermediate blocks 17, 18 are inserted at the inner side of the, thin rubber layer 13 in the radial direction of the outer cylinder 16.

As shown in FIG. 1, the intermediate block 18 is formed as a substantially semicircular block shape as seen in the axial direction of the outer cylinder 16. The outer circumferential surface of the intermediate block 18 is fit tightly to the inner circumferential surface of the thin rubber layer 13. Further, as illustrated in FIG. 2, flange portions 17A are formed at both axial direction end portions of the intermediate block 17. The outer circumferential surfaces of the flange portions 17A are fit tightly to the thin rubber layer 13. The intermediate block 18 is fit between the flange portions 17A. As can be seen in FIG. 1, a cut-out portion 17B is formed in a central portion of the intermediate block 17 facing the intermediate block 18. The inner cylinder 12 penetrates through the cut-out portion 17B. A rubber main body 14 is disposed between the intermediate block 17 and the inner cylinder 12. Accordingly, the inner cylinder 12 can move relatively to the outer cylinder 16.

The rubber main body 14 is bonded by vulcanization to the end portion of the arc-shaped portion of the intermediate block 18. A cut-out portion 14A is formed in a portion of the intermediate portion of the rubber main body 14. A main liquid chamber 28 is formed between the cut-out portion 14A and the intermediate block 18. Further, a sub-liquid chamber 30 is formed between the flange portions 17A of the intermediate block 17 and is defined by the intermediate block 17, the thin rubber layer 13 and the first diaphragm 22. The main liquid chamber 28 and the sub-liquid chamber 30 are filled with liquid such as oil, water, or the like.

Figure 5:
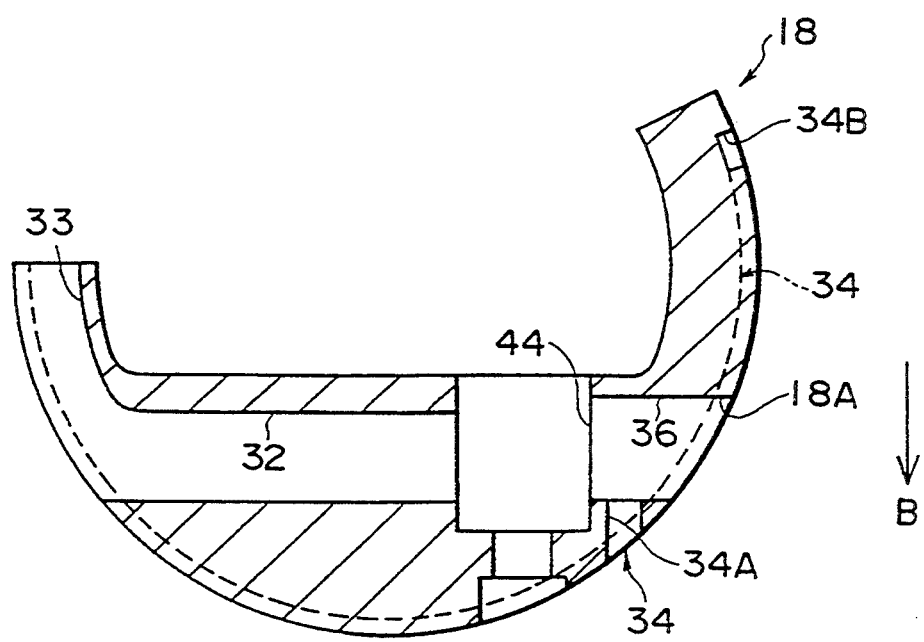
FIG. 5 is a sectional view of the intermediate block, which is taken along line 5—5 of FIG. 4.

A circular hole 44 is formed in the intermediate block 18 in the radial direction on of the outer cylinder 16 so as to face the main liquid chamber 28. Further, as illustrated in FIG. 5, passages 32 and 36 are provided in the intermediate block 18 and are directed outwardly in the radial direction of the circular hole 44. One end of the passage 32 communicates with the side surface of the circular hole 44, and the other end communicates with a passage 33 formed in the outer circumferential surface of the intermediate block 18. When the passage 33 is located within the outer cylinder 16, the passage 33 communicates with the sub-liquid chamber 30.

One end of the passage 36 communicates with the side surface of the circular hole 44, and the other end opens at the outer circumferential surface of the intermediate block 18. As shown in FIGS. 1 and 2, this opening 18A opposes a circular hole 16A, which is formed so as to penetrate through the circumferential wall of the outer cylinder 16, and opposes, via the thin rubber gum 13, a circular hole 11B, which is formed coaxially with the circular hole 16A so as to penetrate the circumferential wall of the annular portion 11A of the mounting frame 11. As illustrated in FIG. 1, the thin rubber layer 13 is formed thickly at an area opposing the circular hole 16A of the outer cylinder 16 so as to form a second diaphragm 24. The second diaphragm 24 closes the opening 18A of the passage 36. The second diaphragm 24 is more rigid than the first diaphragm 22 with respect to liquid pressure.

The sectional area of the passage 36 (hereinafter, "passage sectional area") in a direction orthogonal to the longitudinal direction (the longitudinal direction is the direction in which the liquid passes) is larger than the passage sectional area of the passage 32. Further, the longitudinal direction dimension of the passage 36 is smaller than that of the passage 32, and the transit resistance of the passage 36 is smaller than that of the passage 32. In the present embodiment, the passage sectional area of the passage 32 is formed so as to absorb vibration in a relatively high frequency range among low frequencies (i.e., idle vibration). The passage sectional area of the passage 36 is formed so as to effectively absorb high frequency vibrations (i.e., shaking sounds).

A rotor 52 is inserted into the circular hole 44. A portion of the rotor 52 penetrates through the outer cylinder 16. The rotor 52 receives driving force from a motor 48 mounted to the outer circumference of the outer cylinder 16, and can be rotated thereby. The motor 48 is connected to a control means 46. A vehicle speed sensor 43, which detects the speed of the vehicle, and an engine speed sensor 45, which detects the speed of the engine, are connected to the control means 46. An annular washer 21, which prevents the rotor 52 from falling out, is fastened to a vicinity of the opening portion of the circular hole 44 by screws 21A.

The end portion of the rotor 52 which faces the main liquid chamber 28 is cylindrical. A through-hole 54 is formed in a portion of the cylindrical, circumferential surface of the end portion of the rotor 52. By changing the rotational position of the rotor 52, the through-hole 54 may be positioned in a state in which the through-hole 54 communicates only with the passage 32, and a state in which the through-hole 54 communicates only with the passage 36 (the state illustrated in FIG. 1).

Figure 3:
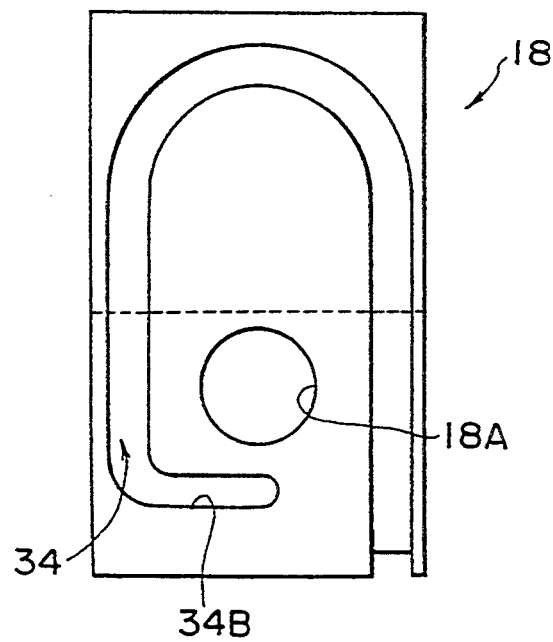
FIG. 3 is a right side view of an intermediate block of FIG. 1.
Figure 4:
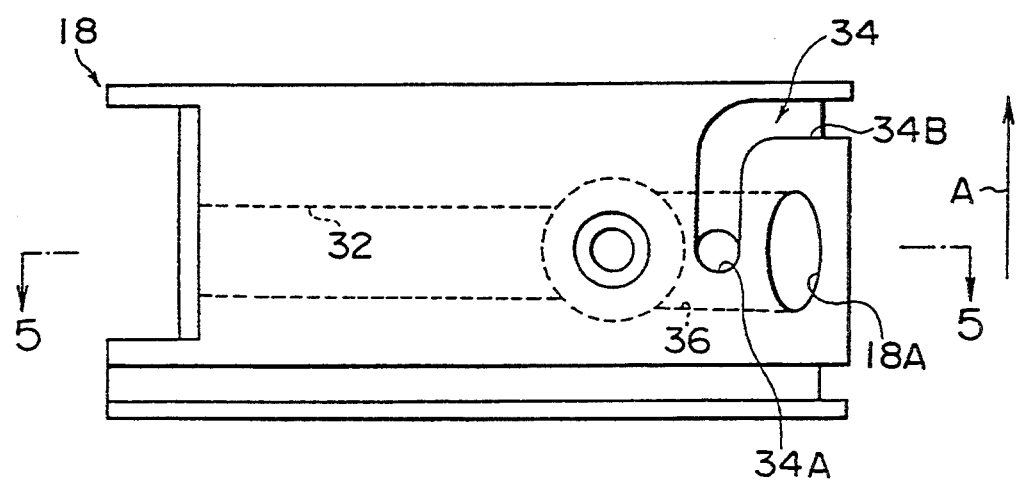
FIG. 4 is a bottom view of the intermediate block of FIG. 1.

As illustrated in FIGS. 3 through 5, a passage 34 is formed in the intermediate block 18. The passage sectional area of the passage 34 is smaller than the respective passage sectional areas of the passages 32, 36. The length of the passage 34 in the longitudinal direction thereof (the direction in which the liquid passes) is longer than the respective longitudinal direction lengths of the passages 32, 36. Further, the transit resistance of the passage 34 is greater than the respective transit resistances of the passages 32, 26. Accordingly, the passage 34 can effectively absorb vibrations of a relatively low frequency range among low frequencies (i.e., shake vibrations). As illustrated in FIG. 5, one end portion of the passage 34 communicates with an intermediate portion of the passage 36 in the longitudinal direction thereof. The other end portion of the passage 34 communicates with the sub-liquid chamber 30. The passage 34 includes a communication hole 34A and a long and narrow recessed portion 34B (see FIGS. 3 and 4). The communication hole 34A penetrates through the intermediate block 18 as it extends from a portion, which communicates with the passage 36, in the direction of arrow B in FIG. 5 which is orthogonal to the longitudinal direction of the passage 36. As illustrated in FIG. 4, the recessed portion 34B extends from the lower end portion of the through-hole 34A in the direction of arrow A in FIG. 4 (the direction which is orthogonal to the page surface of FIG. 5). The recessed portion 34B is formed to extend along the peripheral portion of the outer circumference of the intermediate block 18 to a position which is in a vicinity of the passage 33 and which communicates with the sub-liquid chamber 30.

As shown in FIG. 1, when the passage 34 becomes clogged and the passage 36 is communicated by the through-hole 54 of the rotor 52 so that the passage 32 is closed by the circumferential wall of the rotor 52, the passage 36 forms a liquid chamber 40 which communicates with the main liquid chamber 28 via the interior of the rotor 52. When liquid moves reciprocally between the circular hole 44 and the passage 36, the second diaphragm 24 is deformed, and the liquid chamber 40 expands and contracts. At this time, the interior off the rotor 52 functions as a restricting passage which absorbs shaking sounds.

An air chamber is provided between the first diaphragm 22 and the outer cylinder 16 and is communicated with the exterior of the vibration isolating apparatus 10 as occasion demands.

Next, operation of the first embodiment will be explained.

When the vehicle is idling or traveling at speeds of about 5 km/h, vibration of a relatively high frequency range among low frequencies is generated (idle vibration). Due to the vehicle speed sensor 43 and the engine speed sensor 45, the control means 46 determines whether the vibration currently being generated is idle vibration. If it is determined that idle vibration is being generated, the rotor 52 is rotated, and the main liquid chamber 28 and the passage 32 are communicated by the through-hole 54. The motor 48 is controlled to reach a position at which the passage 36 does not communicate with the main liquid chamber 28 due to the outer circumferential surface of the rotor 52. As a result, the liquid passes through the passage 32 and moves reciprocally between the main liquid chamber 28 and the sub-liquid chamber 30. Liquid-column resonance is generated in the passage 32, and the idle vibration is absorbed.

Further, when the vehicle speed increases and the vehicle travels at speeds of, for example, 40 to 120 km/h, vibration in a high frequency range (i.e., shaking sounds) is generated. Due to the vehicle speed sensor 43 and the engine speed sensor 45, the control means 46 determines whether shaking sounds are being generated. If it is determined that shaking sounds are being generated, the rotor 52 is rotated, and the main liquid chamber 28 and the passage 36 are communicated via the through-hole 54. The motor 48 is controlled to reach a position (i.e., the position in FIG. 1) at which the passage 32 does not communicate with the main liquid chamber 28 due to the outer circumferential surface off the rotor 52.

When shaking sounds are generated, the passage 84 which has large transit resistance becomes clogged, and the liquid moves reciprocally between the main liquid chamber 28 and the liquid chamber 40 via the rotor 52. Namely, the second diaphragm 24 deforms, and the liquid chamber 40 expands and contracts. As a result, liquid-column resonance is generated in the rotor 52, and the shaking sounds are absorbed.

When the vehicle travels at speeds of, for example, 70 to 80 km/h, vibration of a relatively low frequency range among low frequencies is generated (i.e., engine shake vibration, hereinafter, "shake vibration"). Due to the vehicle speed sensor 43 and the engine speed sensor 45, the control means 46 determines whether shake vibration is being generated. If it is determined that shake vibration is being generated, the motor 48 is not driven, and the rotor 52 is maintained at the current position, i.e., the position at which the passage 36 communicates with the main liquid chamber 28 via the through-hole 54 and the passage 32 does not communicate with the main liquid chamber 28 due to the outer circumferential surface of the rotor 52. As a result, the liquid passes through the passage 34 and moves reciprocally between the main liquid chamber 28 and the sub-liquid chamber 30. The shake vibration is absorbed by resistance when the liquid passes through the passage 34 or by liquid-column resonance.

In the present embodiment, the passage 36 for absorbing shaking sounds is provided in addition to the passage 32 for absorbing idle vibration and the passage 34 for absorbing shake vibration. Accordingly, vibration of a wide range of frequencies can be absorbed.

In the above-described embodiment, when the through-hole 54 of the rotor 52 is at the position opposing the passage 36, the main liquid chamber 28 and the sub-liquid chamber 30 communicate via the passage 34 and the passage 36. Therefore, even if the vibration on to be absorbed changes alternately between shaking sounds and shake vibration, the vibration isolating apparatus 10 has a superior effect in that there is no need to drive the rotor 52.

Figure 6:
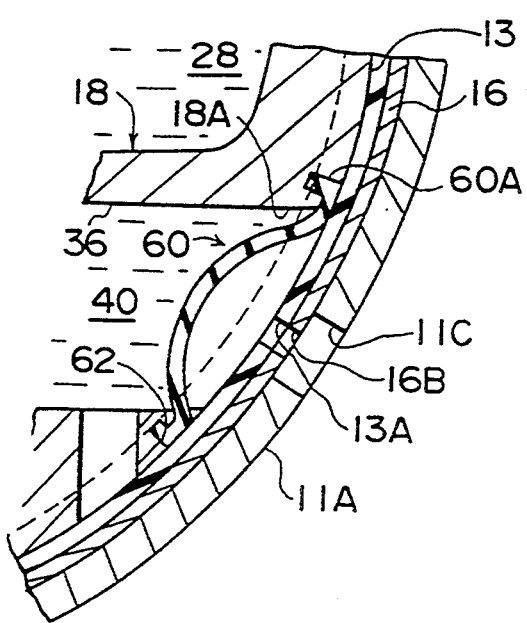
FIG. 6 is a sectional view, in which a portion of a vibration isolating apparatus relating to a second embodiment of the present invention is enlarged.

A vibration isolating apparatus relating to a second embodiment of the present invention will now be described with reference to FIG. 6 in which the passage 36 is enlarged In FIG. 6, members which are the same as those in the first embodiment are denoted with the same reference numerals, and description thereof is omitted.

In the second embodiment, a second diaphragm 60 and the thin rubber layer 13 are provided separately. Namely, peripheral portions 60A of the second diaphragm 60 are fit into insertion holes 62 formed at the passage 36 of the intermediate block 18 in a vicinity of the opening 18A. In this state, the peripheral portions 60A are fit between the intermediate block 18 and the thin rubber layer 13. Accordingly, the second diaphragm 60 closes the opening 18A of the passage 36. Further, air holes 11C, 16B, 13A, which are used for air ventilation, are formed coaxially in the annular portion 11A of the mounting frame 11, the outer cylinder 16, and the thin rubber layer 13, respectively, at positions opposing the second diaphragm 60.

Operation of the second embodiment is basically the same as that of the first embodiment. Namely, when vibration of a relatively high frequency range among low frequencies is generated (idle vibration), the idle vibration on is absorbed due to resistance when the liquid passes through the passage 32 or due to liquid-column resonance. Further, when vibration of a high frequency range is generated (shaking sounds), the passage 34 becomes clogged, and the liquid chamber 40, which communicates with the main liquid chamber 28 by the circular hole 44 of the intermediate block 18, the passage 36 and the second diaphragm 60, is formed. Accordingly, the liquid moves reciprocally between the main liquid chamber 28 and the liquid chamber 40 via the rotor 52 (see FIG. 1). As a result, the second diaphragm 60 deforms, and the liquid chamber 40 expands and contracts. Liquid-column resonance is generated in the liquid in the rotor 52, and vibration in the high frequency range is absorbed.

In this state, if shake vibration is generated, liquid-column resonance is generated in the liquid in the passage 34, and the shake vibration is absorbed.

In the second embodiment, the passage 36 for absorbing shaking sounds is provided in addition to the passage 32 for absorbing idle vibration and the passage 34 for absorbing shake vibration. Accordingly, vibration of a wide range of frequencies can be absorbed.

What is claimed is:

1. A vibration isolating apparatus which damps and absorbs vibrations from a vibration generating portion, comprising:

an outer cylinder connected to one of a vibration generating portion and a vibration receiving portion;

an inner cylinder connected to another of the vibration generating portion and the vibration receiving portion;

an elastic body provided between said outer cylinder and said inner cylinder, and deforming when vibration is generated;

a block member provided at an interior of said outer cylinder;

a main liquid chamber formed between said elastic body and said block member, and able to expand and contract;

a sub-liquid chamber separated from said main liquid chamber, and able to expand and contract;

a first diaphragm forming a portion of a partitioning wall of said sub-liquid chamber, and permitting expansion and contraction of said sub-liquid chamber;

a first restricting passage which is formed in said block member, one end portion of said first restricting passage being provided so as to be able to communicate with said main liquid chamber via a cylindrical space formed in said block member, and another end portion of said first restricting passage communicating with said sub-liquid chamber;

a second restricting passage which is formed in said block member, one end portion of said second restricting passage being provided so as to be able to communicate with said main liquid chamber via said cylindrical space, another end portion of said second restricting passage having an open portion which opens so as to oppose an inner circumferential surface of said outer cylinder, and a transit resistance of said second restricting passage being smaller than a transit resistance of said first restricting passage;

a third restricting passage which is formed in said block member, one end portion of said third restricting passage communicating with said sub-liquid chamber, another end portion of said third restricting passage communicating with said second restricting passage, and a transit resistance of said third restricting passage being larger than the transit resistance of said first restricting passage;

a second diaphragm which closes the open portion of said second restricting passage, and which is more rigid than said first diaphragm with respect to liquid pressure; and a rotor which is formed in a hollow cylindrical shape and has an opening in a circumferential wall of said rotor, said rotor being rotatably disposed in a rotor-setting-space which is formed in a cylindrical space and which is provided at an intermediate portion of said cylindrical space of said block member, said rotor rotating to a first position at which said opening opposes said first restricting passage so that said main liquid chamber and said sub-liquid chamber are communicated via said first restricting passage and said second restricting passage and said third restricting passage are closed, and said rotor rotating to a second position at which said opening opposes said second restricting passage so that said second restricting passage and said third restricting passage communicate with said main liquid chamber and said first restricting passage is closed.

2. A vibration isolating apparatus according to claim 1, further comprising:

an intermediate block provided between said outer block and said inner cylinder, said intermediate cylinder communicating with said inner cylinder via said elastic body, and being inserted in an inner circumferential portion of said outer cylinder so as to be fixed to said outer cylinder.

3. vibration isolating apparatus according to claim 2, wherein said block member is formed as a substantially semicircular shape as seen in an axial direction of said outer cylinder, and said block member is mounted between said intermediate cylinder and said outer cylinder.

4. A vibration isolating apparatus according to claim 3, wherein said rotor-setting-space for setting said rotor is disposed such that one end surface portion in an axial direction of said rotor-setting-space for setting said rotor opens to said main liquid chamber, and a radial direction of said rotor-setting-space for setting said rotor is provided along respective axes of said first restricting passage and said second restricting passage which are provided along a chord portion of said block member.

5. A vibration isolating apparatus according to claim 3, wherein said third restricting passage is provided along an outer peripheral portion of an arc-shaped portion of said block member.

6. A vibration isolating apparatus according to claim 1, wherein a thin rubber layer is bonded by vulcanization to an inner circumferential surface of said outer cylinder, and an unbonded portion off said thin rubber layer forms said first diaphragm.

7. A vibration isolating apparatus according to claim 6, wherein said sub-liquid chamber is formed between said intermediate block and said first diaphragm.

8. A vibration isolating apparatus according to claim 1, wherein a thin rubber layer is bonded by vulcanization to an inner circumferential surface of said outer cylinder, and a portion of said thin rubber layer which opposes the open portion of said second restricting passage forms said second diaphragm.

9. A vibration isolating apparatus according to claim 8, wherein said portion of said thin rubber layer forming said second diaphragm is formed thicker than other portions of said thin rubber layer.

10. A vibration isolating apparatus according to claim 8, wherein a through-hole is provided at a portion of said outer cylinder which opposes the open portion of said second restricting passage via said second diaphragm.

11. A vibration isolating apparatus according to claim 1, wherein said second diaphragm is a rubber film, and said rubber film is fit between said block member and an inner circumferential portion of said outer cylinder so as to close the open portion of said second restricting passage.

12. A vibration isolating apparatus according to claim 11, wherein said rubber film is curved so as to protrude toward an interior of said second restricting passage, and an air chamber is formed between said rubber film and the inner circumferential portion of said outer cylinder.

13. A vibration isolating apparatus according to claim 12, wherein an air hole, which is used for air ventilation, is formed in said outer cylinder at a portion opposing the open portion of said second restricting passage via said rubber film.

14. A vibration isolating apparatus according to claim 1, wherein said first restricting passage is formed so as to absorb idle vibration.

15. A vibration isolating apparatus according to claim 1, wherein said second restricting passage is formed so as to absorb shaking sounds.

16. A vibration isolating apparatus according to claim 1, wherein said third restricting passage is formed so as to absorb shake vibration.

17. A vibration isolating apparatus according to claim 1, wherein said outer cylinder is mounted to the vibration receiving portion and said inner cylinder is mounted to the vibration generating portion.

18. A vibration isolating apparatus according to claim 1, further comprising:

a motor for driving said rotor.

19. A vibration isolating apparatus according to claim 18, further comprising:

control means for controlling said motor.

20. A vibration isolating apparatus according to claim 19, wherein said control means controls said motor by detecting at least one of a speed of an engine main body which serves as the vibration generating portion and a speed of a vehicle in which the engine main body is installed.

* * * * *